US008058828B2

United States Patent
Lin et al.

(10) Patent No.: US 8,058,828 B2
(45) Date of Patent: Nov. 15, 2011

(54) COMPENSATING SYSTEM AND METHOD FOR COGGING TORQUE OF MOTOR

(75) Inventors: You-Ren Lin, Taipei Hsien (TW); Yaw-Shen Lai, Taipei Hsien (TW); Rong-Hwang Horng, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 404 days.

(21) Appl. No.: 12/417,613

(22) Filed: Apr. 2, 2009

(65) Prior Publication Data

US 2010/0156332 A1 Jun. 24, 2010

(30) Foreign Application Priority Data

Dec. 20, 2008 (CN) .......................... 2008 1 0306406

(51) Int. Cl.
*H02P 6/10* (2006.01)
(52) U.S. Cl. .............. 318/400.24; 318/400.25; 318/128; 318/460
(58) Field of Classification Search ............. 318/400.23, 318/400.24, 400.25, 128, 460
See application file for complete search history.

(56) References Cited

U.S. PATENT DOCUMENTS

| 5,023,924 | A * | 6/1991 | Tajima et al. | 388/811 |
| 6,049,182 | A * | 4/2000 | Nakatani et al. | 318/432 |
| 6,690,137 | B2 * | 2/2004 | Iwaji et al. | 318/700 |
| 6,838,854 | B2 * | 1/2005 | Inagaki et al. | 318/701 |
| 7,117,754 | B2 * | 10/2006 | Neely et al. | 73/862.333 |
| 7,568,778 | B2 * | 8/2009 | Terada et al. | 347/16 |

* cited by examiner

*Primary Examiner* — Rita Leykin
(74) *Attorney, Agent, or Firm* — Altis Law Group, Inc.

(57) ABSTRACT

A compensating system for compensating a cogging torque of a motor includes a speed measuring apparatus, a moment of inertia measuring apparatus, a rotor position sensor, a processor, a plurality of band-pass filters, and a current control apparatus. The processor receives a speed, a moment of inertia, and a rotor position of the motor, to determine the cogging torque of the motor. Each band-pass filter is arranged with a different frequency to filter different frequencies of waveforms of the cogging torque. The processor determines a Fourier transformation of the cogging torque according to a number of Fourier coefficients from the band-pass filters, a cogging torque at a preset rotor position, and a cogging current according to the Fourier transformation of the cogging torque. The current control apparatus outputs a current opposite to the cogging current, to compensate the cogging torque of the motor.

7 Claims, 3 Drawing Sheets

COMPENSATING SYSTEM AND METHOD FOR COGGING TORQUE OF MOTOR

BACKGROUND

1. Technical Field

Embodiments of the present disclosure relate to compensating systems and methods, and more particularly to a compensating system and a method for cogging torque of a motor.

2. Description of the Related Art

Cogging torque of a permanent magnet motor is the torque due to the interaction between permanent magnets of a rotor and stator slots of the permanent magnet motor. Cogging torque is undesirable for the operation of the permanent magnet motor. Generally the cogging torque is especially prominent when the permanent magnet motor is operating at lower speeds, causing jerkiness.

The magnet pole are or width of a permanent magnet motor are usually optimized to reduce the cogging torque of the permanent magnet motor. However, changing structures of interior components of the permanent magnet motor is subject to the size of the permanent magnet motor.

DETAILED DESCRIPTION

Figure 1:
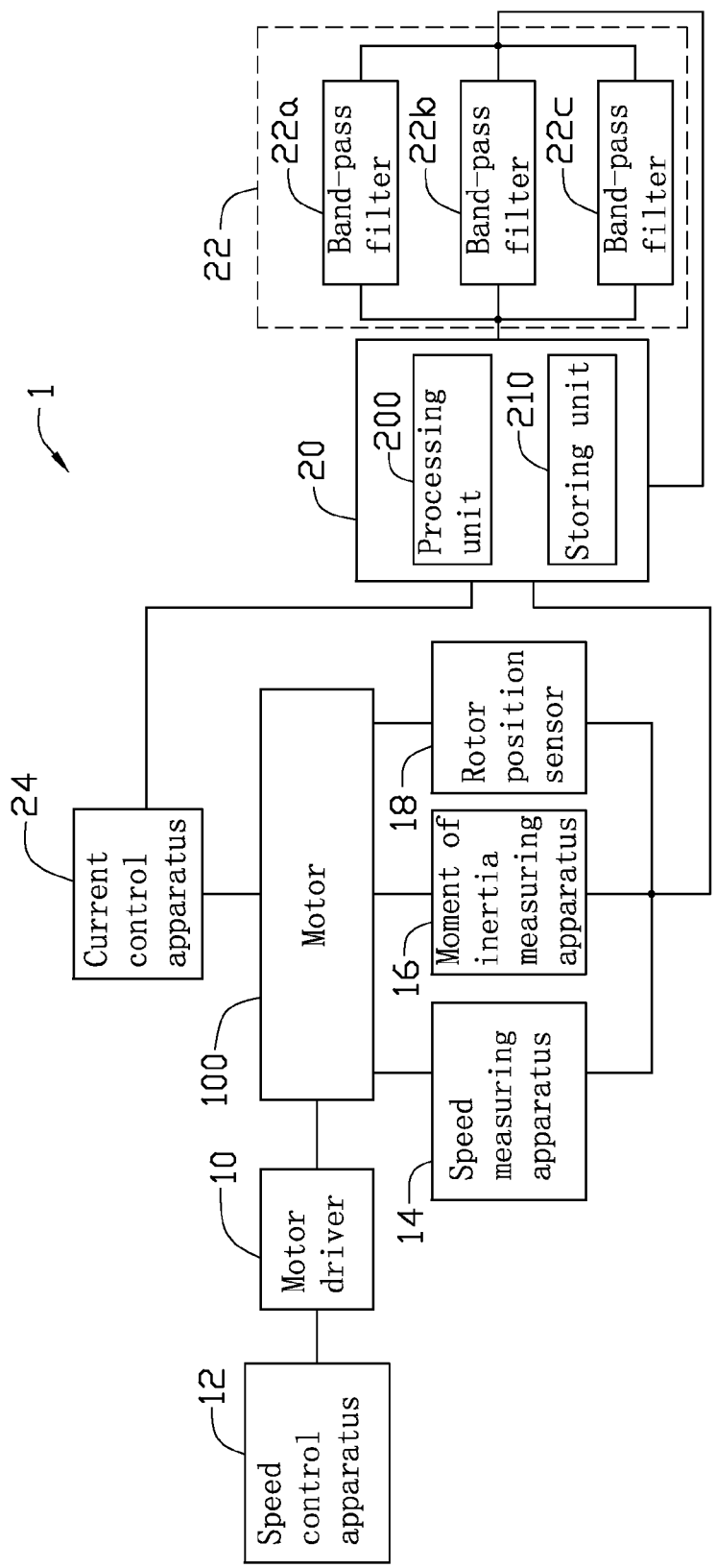
FIG. 1 is a block diagram of an exemplary embodiment of a compensating system for cogging torque of a motor.

Referring to FIG. 1, an exemplary embodiment of a compensating system 1 is used for compensating cogging torque $T_g$ of a motor 100. The compensating system 1 includes a motor driver 10, a speed control apparatus 12, a speed measuring apparatus 14, a moment of inertia measuring apparatus 16, a rotor position sensor 18, a processor 20, a plurality of band-pass filters 22, and a current control apparatus 24. The processor 20 includes a processing unit 200 and a storing unit 210. The number of the band-pass filters 22 is m, where m is an integer which is greater than 1. In the exemplary embodiment, m is equal to 3. The plurality of band-pass filters 22 include a first band-pass filter 22a, a second band-pass filter 22b, and a third band-pass filter 22c.

The motor driver 10 is configured to drive the motor 100. The speed control apparatus 12 is configured to output a speed signal to the motor driver 10 to adjust the speed of the motor 100. The speed measuring apparatus 14 is configured to measure the speed of the motor 100 at a first moment and store the speed in the storing unit 210. The moment of inertia measuring apparatus 16 is configured to measure the moment of inertia of the motor 100 at the first moment and store the moment of inertia in the storing unit 210. The rotor position sensor 18 is configured to measure the rotor position of the motor 100 at the first moment and store the rotor position in the storing unit 210.

The processing unit 200 stores a plurality of torque formulas and is configured to process the speed and the moment of inertia of the motor 100 to determine the cogging torque $T_g$ of the motor 100 at the first moment according to the plurality of torque formulas. The processing unit 200 is also configured to output the cogging torque $T_g$ of the motor 100 to the band-pass filters 22a, 22b, and 22c.

The band-pass filters 22a, 22b, and 22c are structured and arranged to filter different frequencies of a waveform of the cogging torque $T_g$ to process the cogging torque $T_g$ of the motor 100 to have three different cogging torques $T_{g0}$, $T_{g1}$, and $T_{g2}$. The three cogging torques $T_{g0}$, $T_{g1}$, and $T_{g2}$ are output to the processing unit 200. The processing unit 200 processes the three cogging torques $T_{g0}$, $T_{g1}$, and $T_{g2}$ to determine a result according to the plurality of torque formulas, and adjust input current of the motor 100 via the current control apparatus 24 according to the result to compensate for the cogging torque $T_g$ of the motor 100. It may be understood that because the band-pass filters 22a, 22b, 22c are arranged to filter different frequencies of the cogging torque $T_g$, each of the band-pass filters 22a, 22b, 22c may have a different cutoff frequency. Accordingly, the band-pass filters 22a, 22b, 22c may comprise one of more resistors, capacitors, and/or inductors structured and arranged to filter the different frequencies.

Figure 2:
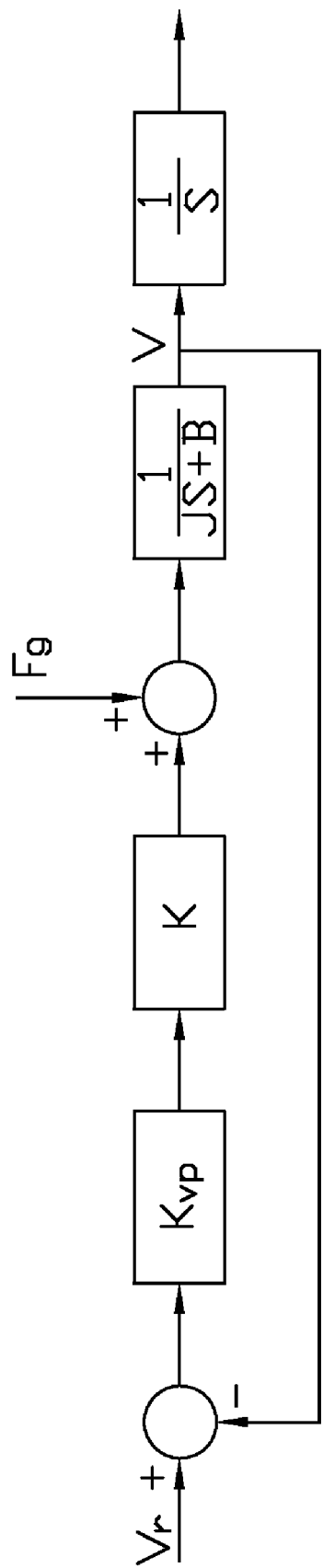
FIG. 2 is a closed-loop diagram of the motor

Referring to FIG. 2, $K_{vp}$ is a constant and denotes a proportion of the speed control apparatus 12, $V_r$ denotes the speed signal from the speed control apparatus 12. J denotes the moment of inertia of the motor 100, $F_g$ denotes a torque which has a different direction from the cogging torque $T_g$ of the motor 100, B denotes a general coefficient, S denotes a Laplace operator, K denotes a gain constant, and V denotes the speed of the motor 100.

According to the closed-loop diagram of the motor 100 in FIG. 2, a first equation below is derived:

$$[(V_V - V) \times K_{vp} \times K + F_g] \times \frac{1}{JS + B} = V; \text{ and} \qquad \text{formula (1)}$$

$$T_g = K_{vp}K(V_r - V) - JVS - BV.$$

Figure 3:
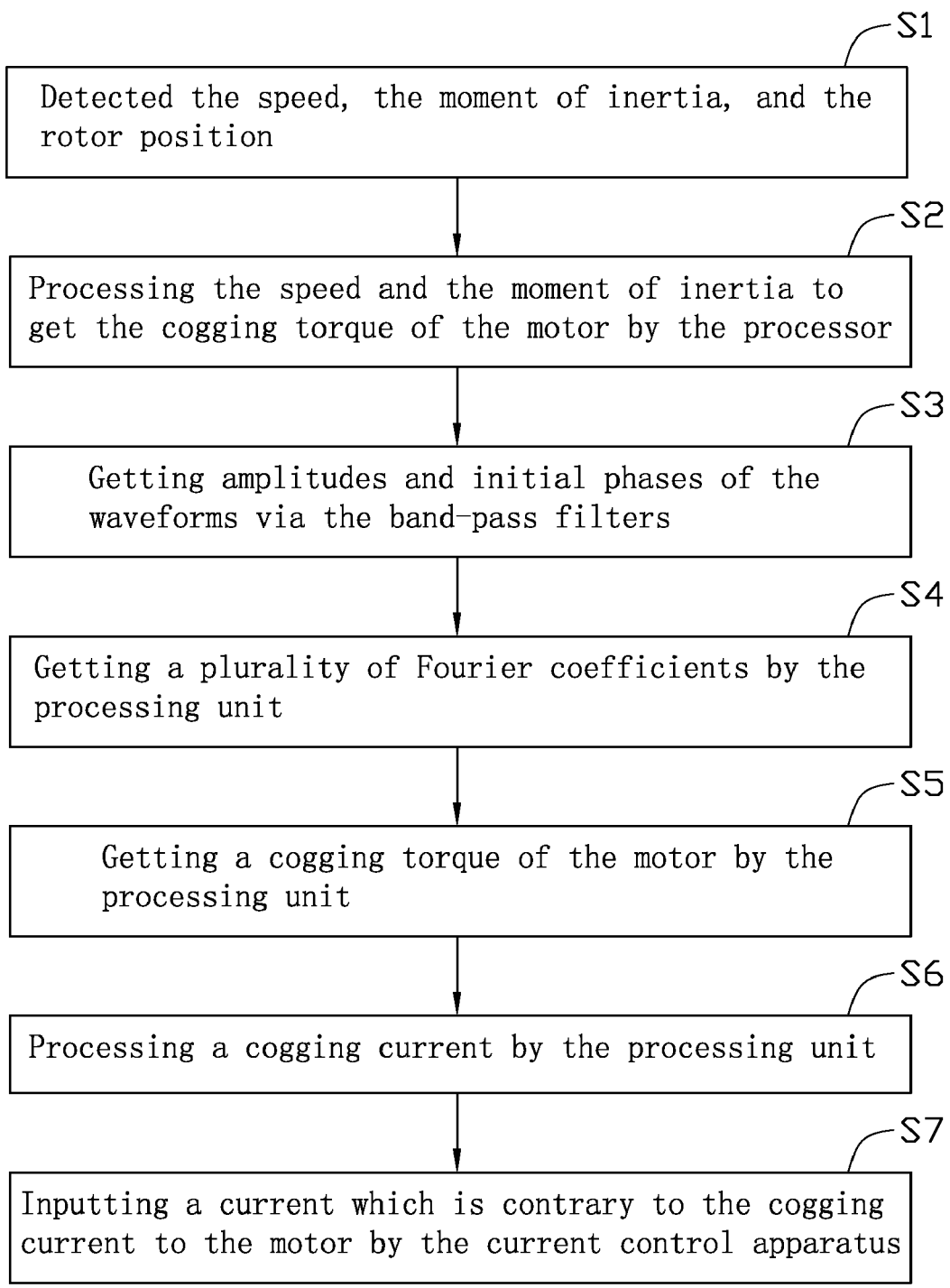
FIG. 3 is a flowchart of an exemplary embodiment of a compensating method for cogging torque of a motor.

Referring to FIG. 3, an exemplary embodiment of a compensating method is used for compensating for the cogging torque $T_g$ of the motor 100. The compensating method includes the following steps.

In step S1, the speed control apparatus 12 outputs the speed signal $V_r$ to the motor driver 10 to turn on the motor 100. When the motor 100 achieves a steady state, the speed V of the motor 100, the moment of inertia J of the motor 100, and the rotor position X are detected by the speed measuring apparatus 14, the moment of inertia measuring apparatus 16, and the rotor position sensor 18, respectively.

In step S2, the speed V and the moment of inertia J of the motor 100 are transmitted to the storing unit 210. The processing unit 200 processes the speed V and the moment of inertia J of the motor 100 to determine the cogging torque $T_g$ of the motor 100 according to the formula (1). The processing unit 200 processes the cogging torque $T_g$ using a Fourier transformation to determine a second equation as below.

$$T_g = T_{g0} + \sum_{n=1}^{y} T_{gn}\sin\left(\frac{2\pi n X}{M} + \theta_n\right) \qquad \text{formula (2)}$$

$$= H_{r0} + H_{r1}\sin\left(\frac{2\pi X}{M}\right) + H_{r2}\cos\left(\frac{2\pi X}{M}\right) +$$

$$H_{r3}\sin\left(\frac{4\pi X}{M}\right) + H_{r4}\cos\left(\frac{4\pi X}{M}\right) + \ldots +$$

$$H_{r(2y-1)}\sin\left[\frac{2(2y-1)\pi X}{M}\right] + H_{r2y}\cos\left(\frac{4y\pi X}{M}\right);$$

wherein:

$H_{r0} = T_{g0}$;

$H_{r1} = T_{g1}\cos\theta_1$, $H_{r2} = T_{g1}\sin\theta_1$;

$H_{r3} = T_{g2}\cos\theta_2$, $H_{r4} = T_{g2}\sin\theta_2$;

$H_{r(2y-1)} = T_{gy}\cos\theta_y$, $H_{r2y} = T_{gy}\sin\theta_y$. \qquad formula (3);

$H_{r1}$, $H_{r2}$, $H_{r3}$, $H_{r4}$, ..., $H_{r(2y-1)}$, $H_{r2y}$ denote Fourier coefficients of the Fourier transformation of the cogging torque $T_g$, $T_{g0}$ is a constant, m denotes a pole pitch of the motor 100.

In step S3, a degree y in formula (2) is set according to the number of the band-pass filters 22. In the exemplary embodiment, the degree y is equal to 3. The processing unit 200 transmits the cogging torque $T_g$ of the motor 100 to the three band-pass filters 22a, 22b, and 22c. In the exemplary embodiment, a frequency of the first band-pass filter 22a is f1 (e.g., the middle frequency of the passband of the band-pass filter), a frequency of the second band-pass filter 22b is f2, and a frequency of the third band-pass filter 22c is f3. When the cogging torque $T_g$ of the motor 100 passes through the first band-pass filter 22a, the first band-pass filter 22a outputs a first waveform with the frequency f1. An amplitude of the first waveform is equal to $T_{g1}$ in the formula (2), and an initial phase of the first waveform is equal to $\theta_1$ in the formula (2). When the cogging torque $T_g$ of the motor 100 passes through the second band-pass filter 22b, the second band-pass filter 22b outputs a second waveform with the frequency f2. An amplitude of the second waveform is equal to $T_{g2}$ in the formula (2), and an initial phase of the second waveform is equal to $T_{g2}$ formula (2). When the cogging torque $T_g$ of the motor 100 passes through the third band-pass filter 22c, the third band-pass filter 22c outputs a third waveform with the frequency f3. An amplitude of the third waveform is equal to $T_{g3}$ in the formula (2), and an initial phase of the first waveform is equal to $\theta_3$ in the formula (2). The $T_{g1}$, $T_{g2}$, $T_{g3}$, $\theta_1$, $\theta_2$, and $\theta_3$ are transmitted to the processing unit 200. In the embodiment, f1>f2>f3.

It may be understood that the greater the degree of y, the greater number of Fourier coefficients $H_{r2y}$, thus the compensating method is more precise.

In step S4, the processing unit 200 determines a third equation as below according to the formula (3):

$$T_{g0} = H_{r0}; \quad \text{formula (4)}.$$

$$T_{g1} = \frac{H_{r1}}{\cos\theta_1}, \theta_1 = \tan^{-1}\left(\frac{H_{r2}}{H_{r1}}\right);$$

$$T_{g2} = \frac{H_{r3}}{\cos\theta_2}, \theta_2 = \tan^{-1}\left(\frac{H_{r4}}{H_{r3}}\right);$$

$$\ldots$$

$$T_{gy} = \frac{H_{r(2y-1)}}{\cos(\theta_y)}, \theta_y = \tan^{-1}\left(\frac{H_{r2y}}{H_{r(2y-1)}}\right).$$

The processing unit 200 determines the Fourier coefficients $H_{r2y}$ of the cogging torque $T_g$ of the motor 100 according to the formula (4). As a result, the Fourier transformation of the cogging torque $T_g$ of the motor 100 is determined.

In step S5, the processing unit 200 determines a cogging torque $T_g$ of the motor 100 when the rotor position of the motor 100 is X according to the Fourier transformation of the cogging torque $T_g$ of the motor 100.

In step S6, the processing unit 200 processes a cogging current $I_{cogging}$ according to a relationship between the input current and the cogging torque $T_g$ of the motor 100.

In step S7, the current control apparatus 24 outputs a current which flows opposite to the cogging current $I_{cogging}$ to compensate the cogging torque $T_g$ of the motor 100.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A compensating system for compensating a cogging torque of a motor, the compensating system comprising:
    a speed measuring apparatus to measure a speed of the motor;
    a moment of inertia measuring apparatus to measure a moment of inertia of the motor;
    a rotor position sensor to measure a rotor position of the motor;
    a processor to receive the speed, the moment of inertia, and the rotor position of the motor, and to determine the cogging torque of the motor according to the speed and the moment of inertia of the motor;
    a plurality of band-pass filters, wherein each of the plurality of band-pass filters is arranged to filter frequencies of a waveform of the cogging torque of the motor, and to have a different frequency from frequencies of the others of the plurality of band-pass filters, to determine a plurality of Fourier coefficients of the Fourier transformation of the cogging torque, wherein the processor determines a Fourier transformation of the cogging torque with the rotor position as a variable according to the plurality of Fourier coefficients, a cogging torque at a preset rotor position, and a cogging current according to the Fourier transformation of the cogging torque; and
    a current control apparatus to output a current to compensate the cogging torque of the motor, wherein the current flows opposite to the cogging current.

2. The compensating system of claim 1, wherein the processor comprises:
    a storing unit to store a plurality of torque formulas, the speed, the moment of inertia, and the rotor position of the motor; and
    a processing unit to process the cogging torque of the motor, the Fourier transformation of the cogging torque, and the cogging current according to the plurality of torque formulas, the speed, the moment of inertia, and the rotor position of the motor.

3. The compensating system of claim 1, wherein the processor processes the cogging torque of the motor according to a first equation as below:

$$T_g = K_{vp}K(V_r-V) - JVS - BV,$$

where, $K_{vp}$ denotes a proportion of a speed control apparatus, $V_r$ denotes a speed signal from the speed control apparatus, J denotes the moment of inertia of the motor, $T_g$ denotes the cogging torque of the motor, B denotes a general coefficient S denotes a Laplace operator, K denotes a gain constant, and V denotes the speed of the motor, wherein the speed control apparatus is to output the speed signal to control the motor.

4. The compensating system of claim 3, wherein the processor processes the Fourier transformation of the cogging torque with the rotor position as a variable according to a second equation as below:

$$T_g = T_{g0} + \sum_{n=1}^{y} T_{gn}\sin\left(\frac{2\pi nX}{M} + \theta_n\right)$$

$$= H_{r0} + H_{r1}\sin\left(\frac{2\pi X}{M}\right) + H_{r2}\cos\left(\frac{2\pi X}{M}\right) +$$

$$H_{r3}\sin\left(\frac{4\pi X}{M}\right) + H_{r4}\cos\left(\frac{4\pi X}{M}\right) + \ldots +$$

$$H_{r(2y-1)}\sin\left[\frac{2(2y-1)\pi X}{M}\right] + H_{r2y}\cos\left(\frac{4y\pi X}{M}\right),$$

where, $H_{r1}$, $H_{r2}$, $H_{r3}$, $H_{r4}$, ..., $H_{r(2y-1)}$, $H_{r2y}$ denote Fourier coefficients of the Fourier transformation of the cogging torque, and $H_{r0} = T_{g0}$;

$H_{r1} = T_{g1}\cos\theta_1$, $H_{r2} = T_{g1}\sin\theta_1$;

$H_{r3} = T_{g2}\cos\theta_2$, $H_{r4} = T_{g2}\sin\theta_2$;

$H_{r(2y-1)} = T_{gy}\cos\theta_y$, $H_{r2y} = T_{gy}\sin\theta_y$;

$T_{g0}$ is a constant, $T_{g1}$, $T_{g2}$, ..., and $T_{gy}$ are amplitudes of waveforms passed through the plurality of band-pass filters correspondingly, $\theta_1$, $\theta_2$, ..., and $\theta_y$ are initial phases of the waveforms passed through the plurality of band-pass filters correspondingly, M denotes a pole pitch of the motor, X denotes the rotor position of the motor, y denotes a degree of the Fourier transformation, and y is equal to a number of the plurality of band-pass filters.

5. A compensating method configured for compensating cogging torque of a motor, the compensating method comprising:

measuring a speed, a moment of inertia, and a rotor position of the motor;

determining the speed and the moment of inertia of the motor to determine the cogging torque of the motor;

determining a plurality of Fourier coefficients of the Fourier transformation of the cogging torque by a plurality of band-pass filters, wherein each of the plurality of band-pass filters is arranged with a frequency different from frequencies of the others of the plurality of band-pass filters to filter different frequencies of a waveform of the cogging torque of the motor to determine the plurality of Fourier coefficients;

determining a Fourier transformation of the cogging torque with the rotor position as a variable according to the plurality of Fourier coefficients, a cogging torque at a preset rotor position, and a cogging current according to the Fourier transformation of the cogging torque by the processor; and inputting a current, which flows opposite to the cogging current, to the motor by a current control apparatus to compensate the cogging torque of the motor.

6. The compensating method of claim 5, wherein the processor determines the cogging torque of the motor according to a first equation as below;

$T_g = K_{vp}K(V_r - V) - JVS - BV$, where, $K_{vp}$ denotes a proportion of a speed control apparatus, $V_r$ denotes a speed signal from the speed control apparatus, J denotes the moment of inertia of the motor, $T_g$ denotes the cogging torque of the motor, B denotes a general coefficient, S denotes a Laplace operator, K denotes a gain constant, and V denotes the speed of the motor, wherein the speed control apparatus is to output the speed signal to a motor driver to control the motor.

7. The compensating method of claim 6, wherein the processor determines the Fourier transformation of the cogging torque with the rotor position as a variable according to a second equation as below:

$$T_g = T_{g0} + \sum_{n=1}^{y} T_{gn}\sin\left(\frac{2\pi nX}{M} + \theta_n\right)$$

$$= H_{r0} + H_{r1}\sin\left(\frac{2\pi X}{M}\right) + H_{r2}\cos\left(\frac{2\pi X}{M}\right) +$$

$$H_{r3}\sin\left(\frac{4\pi X}{M}\right) + H_{r4}\cos\left(\frac{4\pi X}{M}\right) + \ldots +$$

$$H_{r(2y-1)}\sin\left[\frac{2(2y-1)\pi X}{M}\right] + H_{r2y}\cos\left(\frac{4y\pi X}{M}\right),$$

where, $H_{r1}$, $H_{r2}$, $H_{r3}$, $H_{r4}$, ..., $H_{r(2y-1)}$, $H_{r2y}$ denote Fourier coefficients of the Fourier transformation of the cogging torque, and $H_{r0} = T_{g0}$;

$H_{r1} = T_{g1}\cos\theta_1$, $H_{r2} = T_{g1}\sin\theta_1$;

$H_{r3} = T_{g2}\cos\theta_2$, $H_{r4} = T_{g2}\sin\theta_2$;

$H_{r(2y-1)} = T_{gy}\cos\theta_y$, $H_{r2y} = T_{gy}\sin\theta_y$;

$T_{g0}$ is a constant, $T_{g1}$, $T_{g2}$, ..., and $T_{gy}$ are amplitudes of waveforms passed through the plurality of band-pass filters correspondingly, $\theta_1$, $\theta_2$, ..., and $\theta_y$ are initial phases of the waveforms passed through the plurality of band-pass filters correspondingly, M denotes a pole pitch of the motor, X denotes the rotor position of the motor, y denotes a degree of the Fourier transformation, and y is equal to a number of the plurality of band-pass filters.

* * * * *